(12) United States Patent
Jackson

(10) Patent No.: US 6,193,223 B1
(45) Date of Patent: Feb. 27, 2001

(54) DAMPENING STRUT

(75) Inventor: Frank Thomas Jackson, Lake Elsinore, CA (US)

(73) Assignee: Hartwell Corporation, Placentia, CA (US)

( * ) Notice: Subject to any disclaimer, the term of this patent is extended or adjusted under 35 U.S.C. 154(b) by 0 days.

(21) Appl. No.: 09/156,471

(22) Filed: Sep. 18, 1998

(51) Int. Cl.$^7$ ........................................................ F16F 5/00
(52) U.S. Cl. .................................... 267/64.12; 267/64.26
(58) Field of Search ............................ 267/64.11, 64.12, 267/64.13, 64.26, 64.28; 16/51, 56, 58

(56) References Cited

U.S. PATENT DOCUMENTS

| | | | |
|---|---|---|---|
| 3,963,101 | * | 6/1976 | Stadelmann et al. ......... 267/64.12 X |
| 4,993,522 | * | 2/1991 | Wagner ........................ 267/64.12 X |
| 4,997,150 | * | 3/1991 | Mardollo ...................... 267/64.12 X |
| 5,115,723 | * | 5/1992 | Wang ............................ 267/64.12 X |
| 5,263,674 | * | 11/1993 | Huang ........................... 267/64.12 X |

OTHER PUBLICATIONS

Engineering Drawing, Strut Assy, Dampening, HA333 (3 Sheets).
Engineering Drawing, Strut, Dampening, SDHA613, Oct. 1996.

* cited by examiner

*Primary Examiner*—Matthew C. Graham
*Assistant Examiner*—Pamela J. Rodriguez
(74) *Attorney, Agent, or Firm*—Pretty & Schroeder, P.C.

(57) ABSTRACT

An improved hydraulic strut (30) for mounting a moveable structure (24) to a support structure, the strut having an outer telescoping member (20) and an inner telescoping member (32). The outer telescoping member defines a first hydraulic chamber (402) and a second hydraulic chamber (400), connected by a fluid flow restrictor (100). The inner telescoping member includes a main piston (200) that translates within the second hydraulic chamber between a closed position, where the inner telescoping member is fully retracted into the outer telescoping member, and an open position, wherein the inner telescoping member is fully extended from the outer telescoping member.

5 Claims, 12 Drawing Sheets

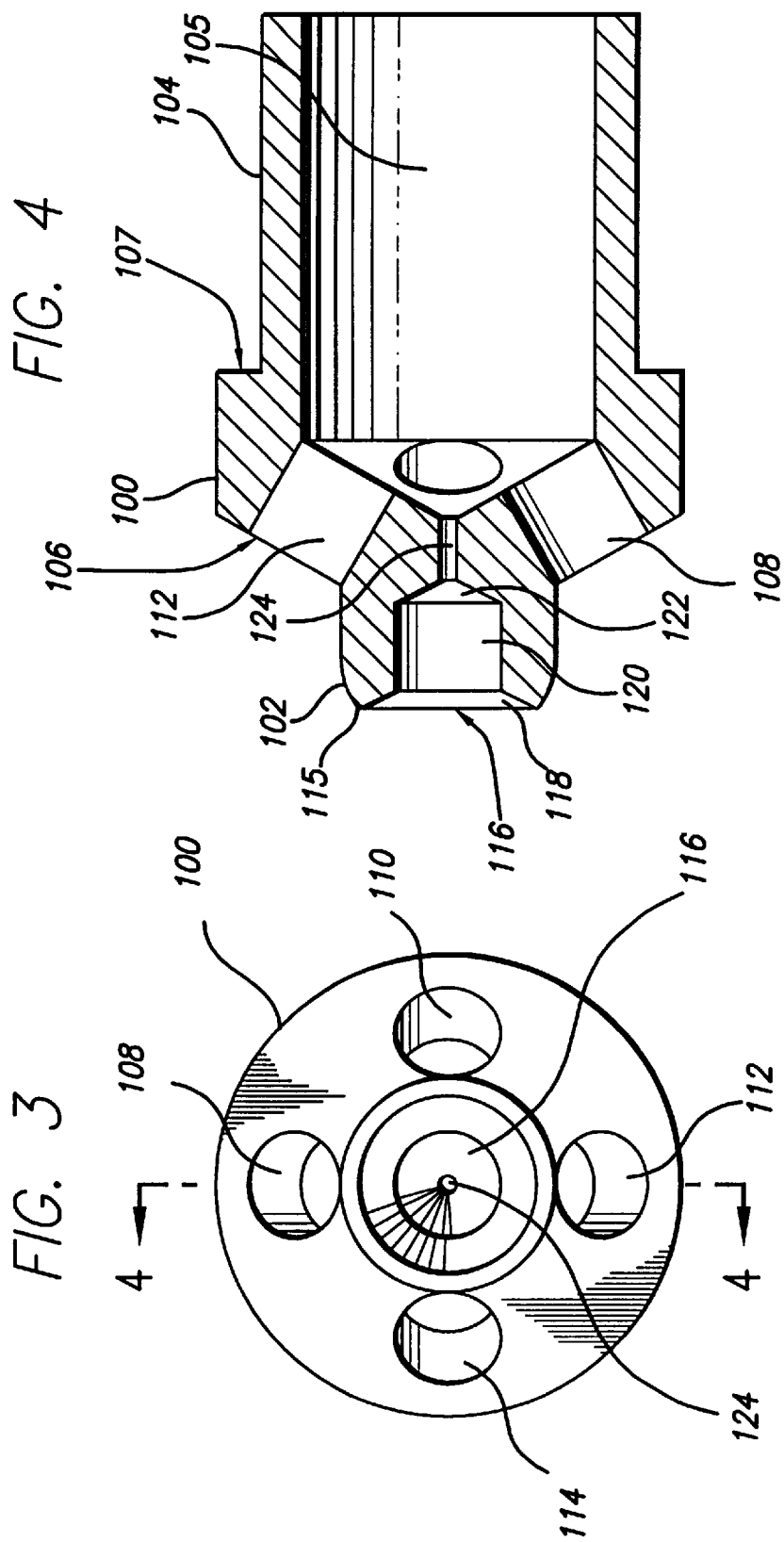

DAMPENING STRUT

BACKGROUND OF THE INVENTION

Hydraulic struts have been used for many years for opening and holding open a door or other closure. Generally, a strut includes two telescoping members and is moveable between a compressed position when the door is closed and an extended position when the door is open. Some struts also provide for locking in the open or extended position.

The speed at which a conventional hydraulic strut extends or compresses is governed by the speed at which hydraulic fluid can enter a chamber and either apply pressure to a moveable piston or fill a vacuum created by the motion of the piston. This fluid flow is created from either the suction action of the retracting piston in a sealed strut, or by an injection system external to the strut.

One disadvantage of conventional hydraulic struts is that the rate of speed at which the strut extends and compresses is the same.

Applications exist where it is desirable to have a strut which opens at one predetermined rate of speed and closes at another. One example is a door which provides access to the personnel carrying area of an aircraft. Doors that can both open rapidly and close slowly allow for rapid and easy exit from the vehicle when the door opens and avoid injuring personnel or damaging items when closing the door. It is also desirable that the strut provide for a mechanism to lock it in the extended or open position.

There exist struts which have variable expansion and compression speeds. These are achieved by using variable flow rate valves which allow for fluid flow at two different speeds, depending on the direction of flow. Rapid opening struts operate by pressurized injection of hydraulic fluid into the strut from an outside source or an injection device. When the strut is compressed, the injected hydraulic fluid is returned to the outside source or discharged from the strut system. A disadvantage of this type of strut is that, because the strut is not sealed and self contained, the hydraulic fluid can become contaminated or leak onto surrounding structures. Another disadvantage is that the addition of an injection device makes the strut system bulkier and more cumbersome than conventional struts.

In view of the above, it should be appreciated that there is still a need for a dampening strut that can open and close at different speeds; is compact, sealed, and self-contained; and can automatically lock in an open position. The present invention satisfies these and other needs and provides further related advantages.

SUMMARY OF THE INVENTION

The present invention is embodied in a hydraulic strut which can open and close at different speeds; is compact, sealed, and self-contained; and can automatically lock in an open position. The hydraulic strut includes an outer telescoping member and an inner telescoping member. The strut has mounts on opposing ends so that it may be attached to a fixed structure and a pivotable door or closure attached to the fixed structure.

A feature of the present invention is that it includes both a second hydraulic reservoir, which is defined by an inner tubular metal cylinder, and a first hydraulic reservoir, which is defined by an outer tubular metal cylinder that circumferentially surrounds the inner cylinder. Thus, the first hydraulic reservoir surrounds the main hydraulic chamber, as opposed to being laterally or longitudinally situated from it. A valve connects the second hydraulic reservoir and the first hydraulic reservoir. Two distinct chambers, connected by a variable rate valve, avoids the need for an injection device and allows the strut to have a predetermined opening rate and a different predetermined closure rate, in a strut which is a self-contained, sealed unit. Furthermore, the struts are shorter and more compact than if the chambers were disposed laterally or longitudinally from one another. This is a significant advantage in areas where space is limited, such as, in aircraft passenger compartments. This feature also increases the strength of the strut.

Another feature is that the first hydraulic reservoir contains an auxiliary piston and the second hydraulic reservoir contains a main piston. The auxiliary piston creates hydraulic pressure which serves as a counter-force against which the main piston presses when the strut is compressing. The counter-force prevents a slippage or a jolt when the strut begins moving from a locked and extended position toward a compressed position, as would normally occur if no counter-force were present. This feature also reduces the volume of the first hydraulic reservoir as the strut extends and hydraulic fluid is drawn from the auxiliary hydraulic chamber into the second hydraulic reservoir by the movement of a main piston. By reducing the volume of the first hydraulic reservoir, the auxiliary piston prevents a suction force from building in the first hydraulic reservoir which would slow the transfer of hydraulic fluid and consequently slow the expansion rate of the strut.

The present invention also includes a unique and advantageous self-locking mechanism. A locking sleeve moveably retains a plurality of locking balls in the shaft of the main piston. The locking sleeve circumferentially surrounds the piston shaft and is spring biased to expose the locking balls when the strut reaches its fully extended position. The piston shaft includes an outer shaft, which is tubular, and an inner shaft, which is a solid rod and is moveably retained within the outer shaft. A trapezoidal shaped annular groove is formed in the inner shaft. A plurality of apertures are formed in the outer shaft. When the strut is not in an extended, locked position, the inner shaft and outer shaft are positioned so that the trapezoidal shaped annular groove is lined up with the plurality of apertures. Located within the space formed by the aligned inner and outer shafts is the plurality of locking balls. In this same position, the locking balls are retained by the spring biased locking sleeve.

A release sleeve circumferentially surrounds the outer shaft, and is accessible by hand from the outside of the strut. A connector pin attaches the release sleeve to the inner shaft and passes through opposed slots in the outer shaft. The release sleeve is spring biased such that when the strut reaches its fully extended position, the release sleeve moves the inner shaft to drive the locking balls into a plurality of spherical depressions formed in a portion of the outer telescoping member. In this position, the locking balls are in contact with both the inner telescoping member and the outer telescoping member, and effectively prevent movement of one relative to the other. To release the strut, an operator moves the release sleeve, and consequently the inner shaft, to a position which allows the locking balls to leave the spherical depressions and return to a retained position.

Several advantages of this release mechanism are that it automatically locks when the strut reaches the extended position, it minimizes the profile of the strut, and it reduces the danger of an accidental release of the lock.

Other features and advantages of the present invention will become apparent from the following description of the preferred embodiments, taken in conjunction with the accompanying drawings, which illustrate, by way of example, the principles of the invention.

DESCRIPTION OF THE DRAWINGS

FIG. 3 is a front view of a valve for the hydraulic strut.

FIG. 4 is a cross section of the valve of FIG. 3.

DETAILED DESCRIPTION OF THE INVENTION

Figure 1:
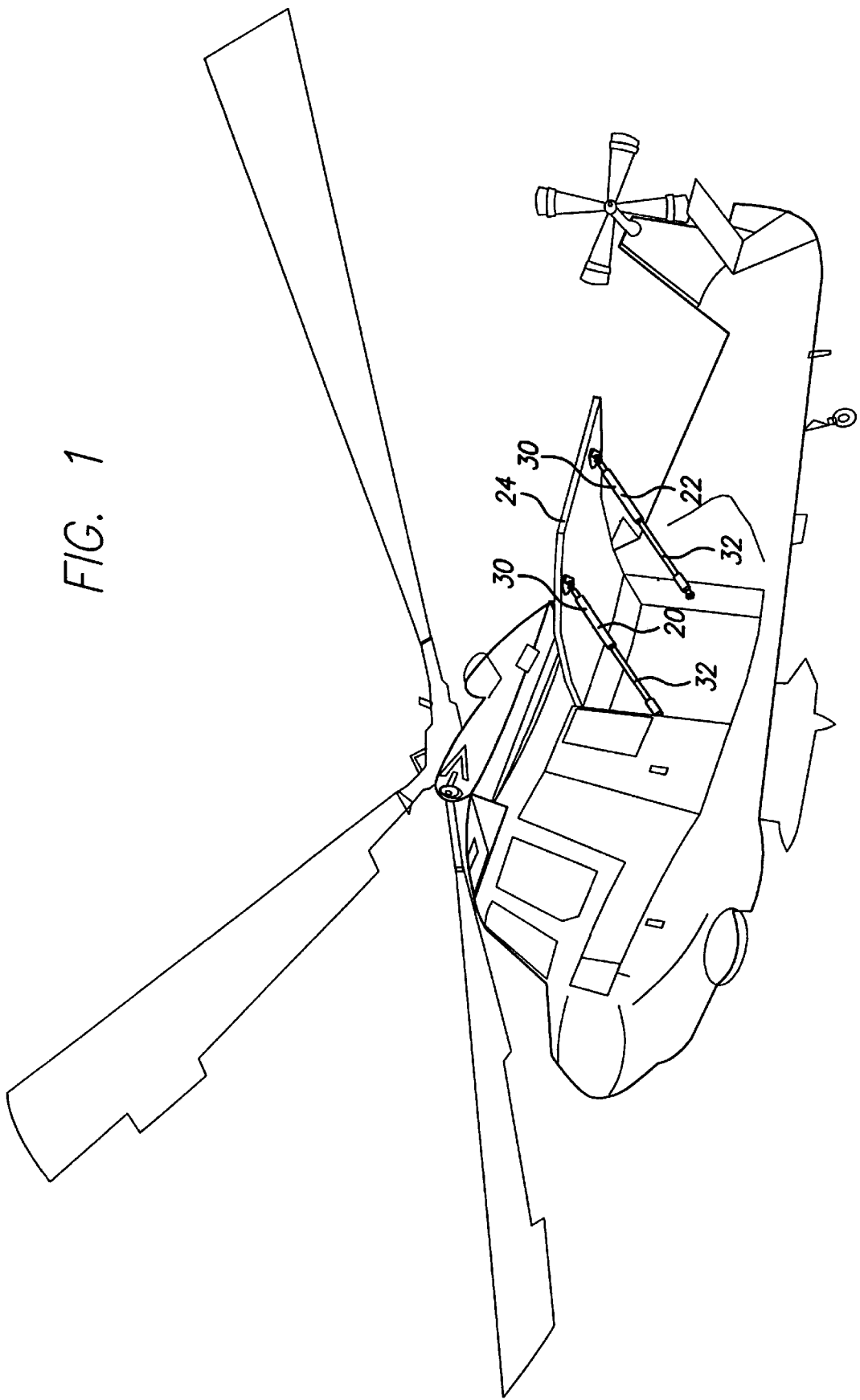
FIG. 1 illustrates a hydraulic strut that supports a door to the passenger carrying area of a helicopter.

With reference to FIG. 1, a pair of identical dampening struts 20, 22 of the present invention are used to support a door 24 to the passenger area of a helicopter. Each strut includes an outer telescoping member 30 and an inner telescoping member 32. Unless otherwise noted, all parts of the struts 20, 22 are preferably made from steel.

Figure 2:
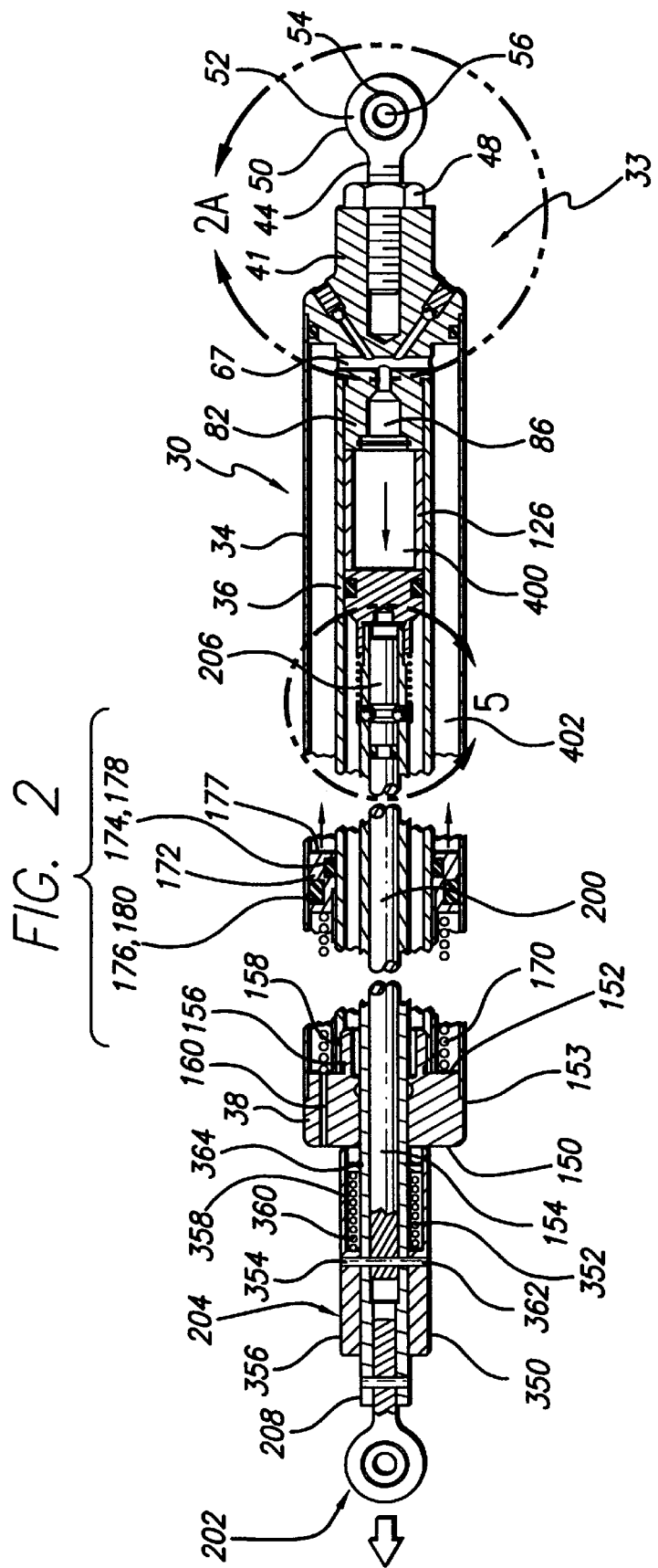
FIG. 2 is a cross section of the hydraulic strut in a compressed position.
Figure 2A:
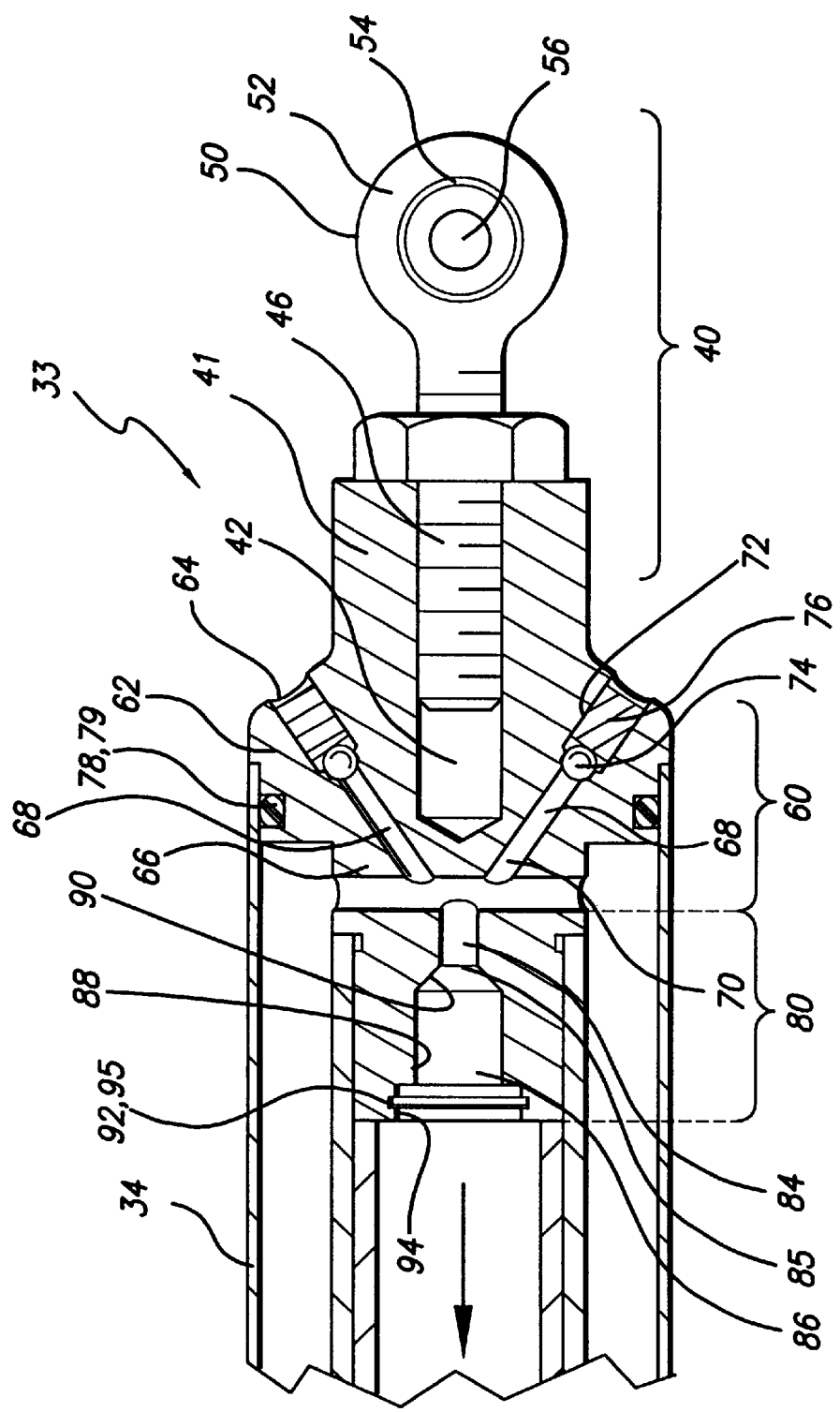
FIG. 2A is an enlarged cross section of an endcap of the hydraulic strut shown in FIG. 2, circle 2A.

With reference to FIGS. 2 and 2A, the outer telescoping member 30 includes an endcap 33, a tube-shaped outer cylinder 34, a tube-shaped inner cylinder 36, and a cylinder head 38. The endcap 33 includes a mount portion 40, a channel portion 60 and a valve portion 80. With reference to FIG. 2A, the mount portion 40 includes a base 41, which is preferably cylindrical in shape. A cylindrical bore 42 is located along the axial center of the base 41. Preferably, the cylindrical bore 42 is threaded. Threadibly mounted to the base 41 at the cylindrical bore 42 is an eyelet mount 44. The eyelet mount 44 includes a threaded shank 46, a nut 48 and an eyelet 50. The nut 48 is threadibly mounted on the threaded shank 46 and tightened securely against the base 41. The eyelet 50 includes a solid ring 52, a circular groove 54, and an aperture 56 formed at the axial center of the ring 52. This configuration of the eyelet 50 allows the strut to be mounted on a conventional axle swivel mount (not shown).

The channel portion 60 of the endcap 33, also shown in FIG. 2A, includes a cylindrical base 62, having an inwardly protruding cylindrical member 66. The cylindrical base 62 is a solid, contiguous extension of the base 41 of the mount portion. The cylindrical base 62 has a greater diameter than the base 41 and the transition from the smaller diameter base 41 to the larger diameter cylindrical base 62 is accomplished by use of a sloping shoulder 64, which extends radially outward from the base 41. Transverse to the longitudinal axis of the cylindrical base 62, a transverse bore 67 is formed through the inwardly protruding cylindrical member 66.

Formed in the sloping shoulder 64 are two angular bores 68. Each angular bore includes a small diameter channel portion 70 and a large diameter sealing portion 72. The small diameter channel portion 70 connects to the transverse bore 67. Located in the large diameter sealing portion 72 is a sealing ball 74 and a plug 76. The sealing ball is seated where the angular bore narrows from the large diameter sealing portion 72 to the small diameter channel portion 70. Adjacent to and firmly secured against the sealing ball 72 is the plug 76. Additionally, the sloping shoulder includes a groove 78 circumferentially disposed around the sloping shoulder 64. Located within the groove 78 is a shoulder O-ring 79.

The valve portion 80, as shown in FIGS. 2 and 2A, is preferably cylindrical and adjacent to and a solid contiguous extension of the cylindrical member 66 of the cylindrical base 64. A longitudinal bore 84 is formed through the radial center of the valve portion 80 and connects to the transverse bore 67. The longitudinal bore 84 includes a larger diameter portion 82 which forms a valve chamber 86. At this point, the longitudinal bore 84 includes a valve seat 85. The valve chamber 86 is cylindrical in shape and defines a cylindrical valve chamber side wall 88 and cylindrical valve chamber sloping wall 90. A recessed, cylindrical groove 92 is formed at a terminal end 94 of the valve chamber 86. Located within the valve chamber 86 is a valve 100. The valve is omitted from FIG. 2 for purposes of clarity, but is shown in detail in FIGS. 3 and 4. Located within the groove 92 is a snap ring 95, which moveably retains the valve 100, as is described further below.

With reference to FIGS. 3 and 4, the valve 100 has a spherical end 102, a cylinder end 104 and a sloping shoulder 106. The cylinder end 104 is tubular and has an interior bore 105. Extending outward from the cylinder end, 104 and positioned between the cylinder end 104 and the spherical end 102, is the sloping shoulder 106. The sloping shoulder 106 includes, as a radial extension of the sloping shoulder 106, a protruding lip 107. Bored through the sloping shoulder 106 are four large diameter fluid flow openings 108, 110, 112, 114. These fluid flow openings 108, 110, 112, 114 open into the interior bore 105 of the cylinder end 104. The spherical end 102 is a contiguous extension of the sloping shoulder 106 and curves inwardly to form a valve head 115 that is a portion of a sphere. Bored through the radial center of the spherical end 102 is a decreasing diameter bore 116 which connects with the interior bore 105 of the cylinder end 104. The decreasing diameter bore 116 is formed such that it has a first narrowing point 118, which connects to a large diameter channel 120, which connects to a second narrowing point 122, which in turn connects to a narrow diameter channel 124. The narrow diameter channel 124 connects to the interior bore 105 of the cylindrical end 104.

With reference to FIGS. 2, and 2A, the valve 100 is located in the valve chamber 86 and oriented so that the spherical end 102 is facing the longitudinal bore 86, and the cylinder end is directed toward the snap ring 95. The protruding lip 107 engages the valve chamber side wall 88. The valve 100 is movably retained within the valve chamber 86 by the snap ring 95 as is further described below. This allows the valve to move between a seated position where the valve head 115 of the spherical end 102 is firmly seated against the longitudinal bore 86, and an unseated position where the protruding lip 107 is in contact with the snap ring 95.

The endcap 33 is connected to the outer cylinder 34 at the cylindrical base 62 such that the O-ring 79 is between the outer cylinder 34 and the cylindrical base 62 to form a tight seal. The endcap 33 is connected to the inner cylinder 36 at the valve seat 80. Preferably, the valve seat 80 and the inner cylinder 36 are each threaded and threadibly engaged to one another. Located within the inner cylinder and adjacent to the valve seat 80 is a short, tube-shaped stop sleeve 126.

Figure 7:
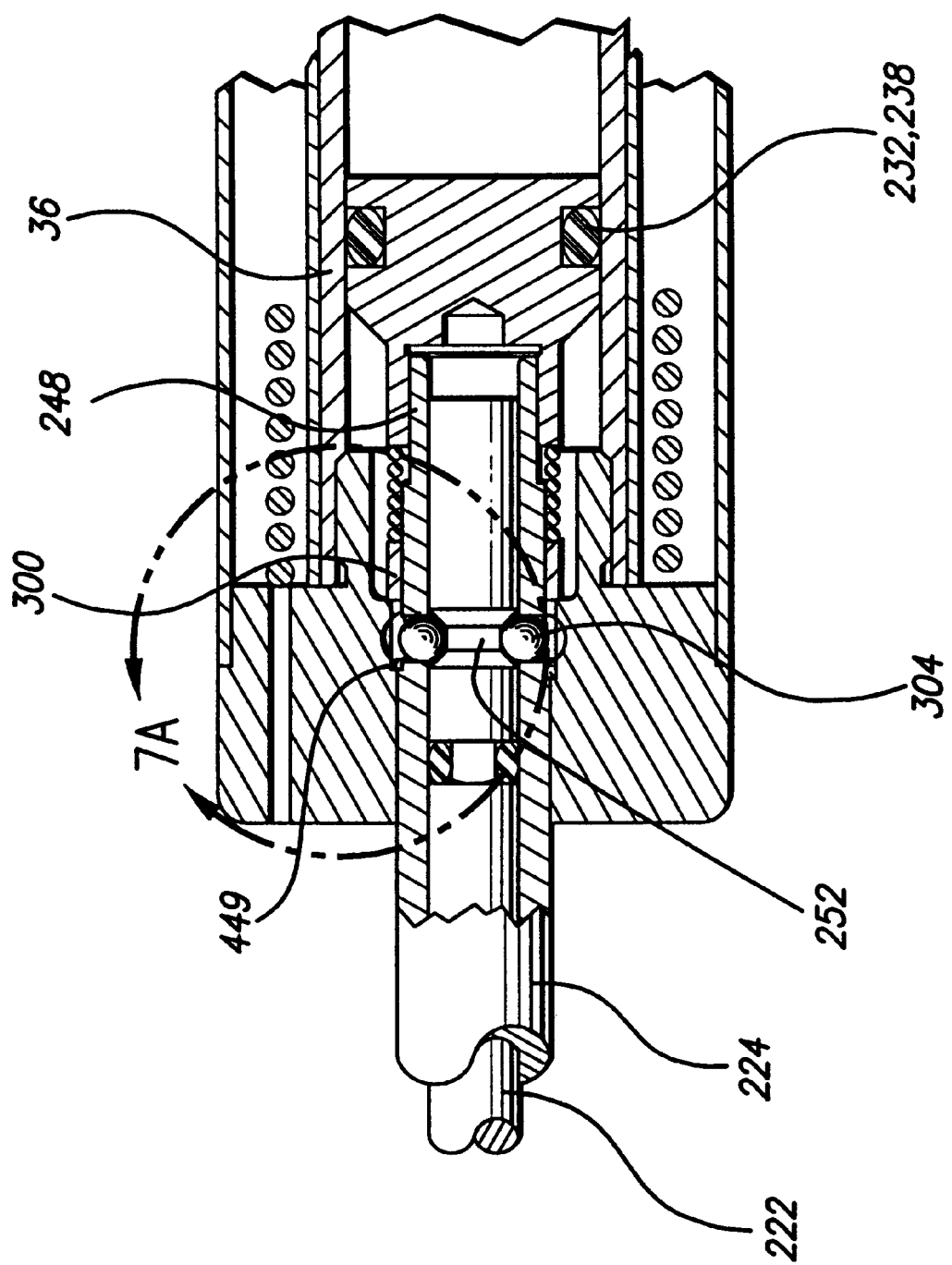
FIG. 7 is an enlarged cross section of the portion of the hydraulic strut shown in FIG. 6, circle 7.
Figure 7A:
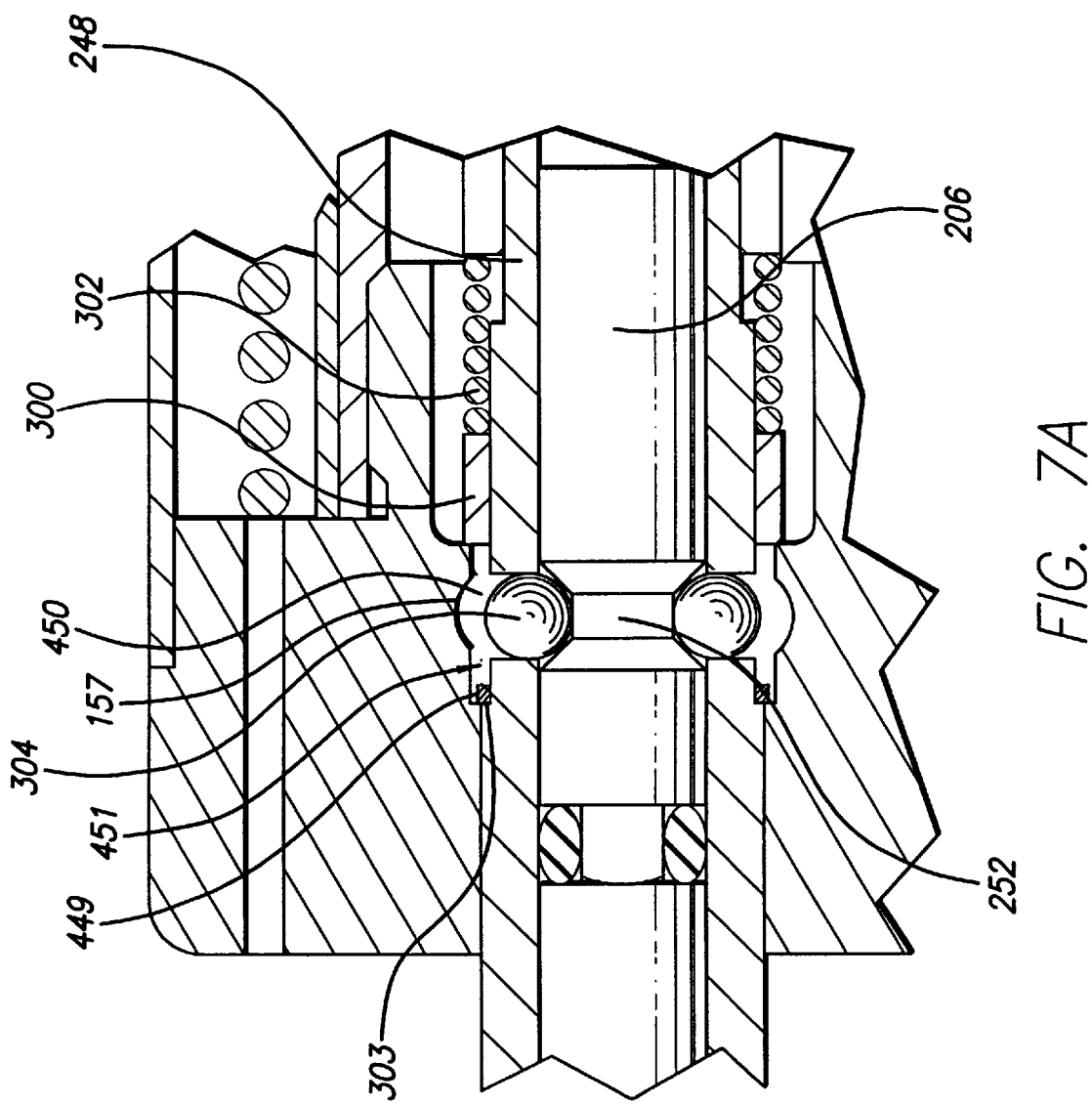
FIG. 7A is an enlarged cross section of the portion of the hydraulic strut shown in FIG. 6, circle 7A.

With reference also to FIGS. 2, 7 and 7A, the cylinder head 38 is a solid cylinder of the same circumference as the outer cylinder 34 and has an outside end 150, an inside end 152 and an outer surface 153. A main aperture 154 is bored through the axial center of the cylinder head 38. Extending from the inside end 152 and positioned radially outside of the main aperture 154 is an attachment sleeve 156. The attachment sleeve is threaded at 158 for attaching the cylinder head 38 to the inner cylinder 36. The cylinder head 38 also includes at least one longitudinal bore 160 radially offset from the main aperture 154 and extending through the cylinder head 38. The cylinder head 38 is threadibly engaged to the outer cylinder 34 at the outer circumference 153 of the inside end 152. Additionally, the cylinder head 38 includes an annular spherical groove 450 formed in the cylinder head 38, a rounded end wall 157 and a shoulder slot 451.

Braced against the inside end 152 of the cylinder head 38 is an auxiliary piston spring 170. The auxiliary piston spring 170 is oriented such that it circumferentially surrounds the inner cylinder 36 and is circumferentially surrounded by the outer cylinder 34. The auxiliary piston spring 170 is braced against an auxiliary piston 172. The auxiliary piston 172 is ring-shaped and located such that it circumferentially surrounds the inner cylinder 36 and is circumferentially surrounded by the outer cylinder 34. The auxiliary piston 172 includes a forward annular groove 174, a rearward annular grove 176 and a face 177. Located within the forward annular groove 174 is a forward auxiliary piston O-ring 178, and located within the rearward annular groove 176 is a rearward auxiliary piston O-ring 180. The forward auxiliary piston O-ring 178 contacts and forms a seal with the inner cylinder 36 and the rearward auxiliary piston O-ring 180 contacts and forms a seal with the outer cylinder 34.

With reference to FIGS. 2, 5, 6, 7, and 7A, the inner telescoping member 32 includes a main piston 200, a mount portion 202, and a release mechanism 204. The main piston 200 includes a main piston head 220, an inner shaft 222, an outer shaft 224, and a locking mechanism 226.

The main piston head 220 is cylindrical shaped and includes a face 230, a main block 231, an annular groove 232, and an attachment sleeve 234. The main piston head 220 is configured such that the main block diameter is just slightly less than the inner diameter 236 of the inner cylinder 36. This allows the main piston head 200 to be moveably retained within the inner cylinder 36. The face 230 is a flat, circular surface, which, when the strut is in operation, is in contact with the hydraulic fluid. Located within the annular groove 232 is a main piston O-ring 238. The main piston O-ring contacts and forms a tight seal with an inner wall 240 of the inner cylinder 36. The main piston head 200 also includes a sloping shoulder 242 which is adjacent to and a solid contiguous extension of the main block 231 opposite the face 230. Extending from the sloping shoulder 242 is the attachment sleeve 234. The attachment sleeve 234 has a rim 244 and an inner side 246. Preferably, the inner side 246 is threaded.

The outer shaft 224 is tubular and includes a threaded head end 248 and at least two openings 250 through which at least two locking balls 304 move, as will be discussed further below. The outer shaft 224 is threadibly attached at the head end 248 to the inner side 246 of the piston head. The outer shaft 224 also includes a small bracing shoulder 449. Moveably retained within the outer shaft 224 is the inner shaft 222. The inner shaft 222 includes a trapezoidal groove 252 disposed circumferentially about the inner shaft 222 and an annular groove 254. Located within the annular groove 254 is an inner shaft O-ring 258. The inner shaft O-ring 258 contacts and creates a seal against an inner side 260 of the outer shaft 224. protecting the locking mechanism 226 from contamination entering through the openings in the outer shaft 224 associated with the release mechanism 204, which is more fully described below.

Figure 5:
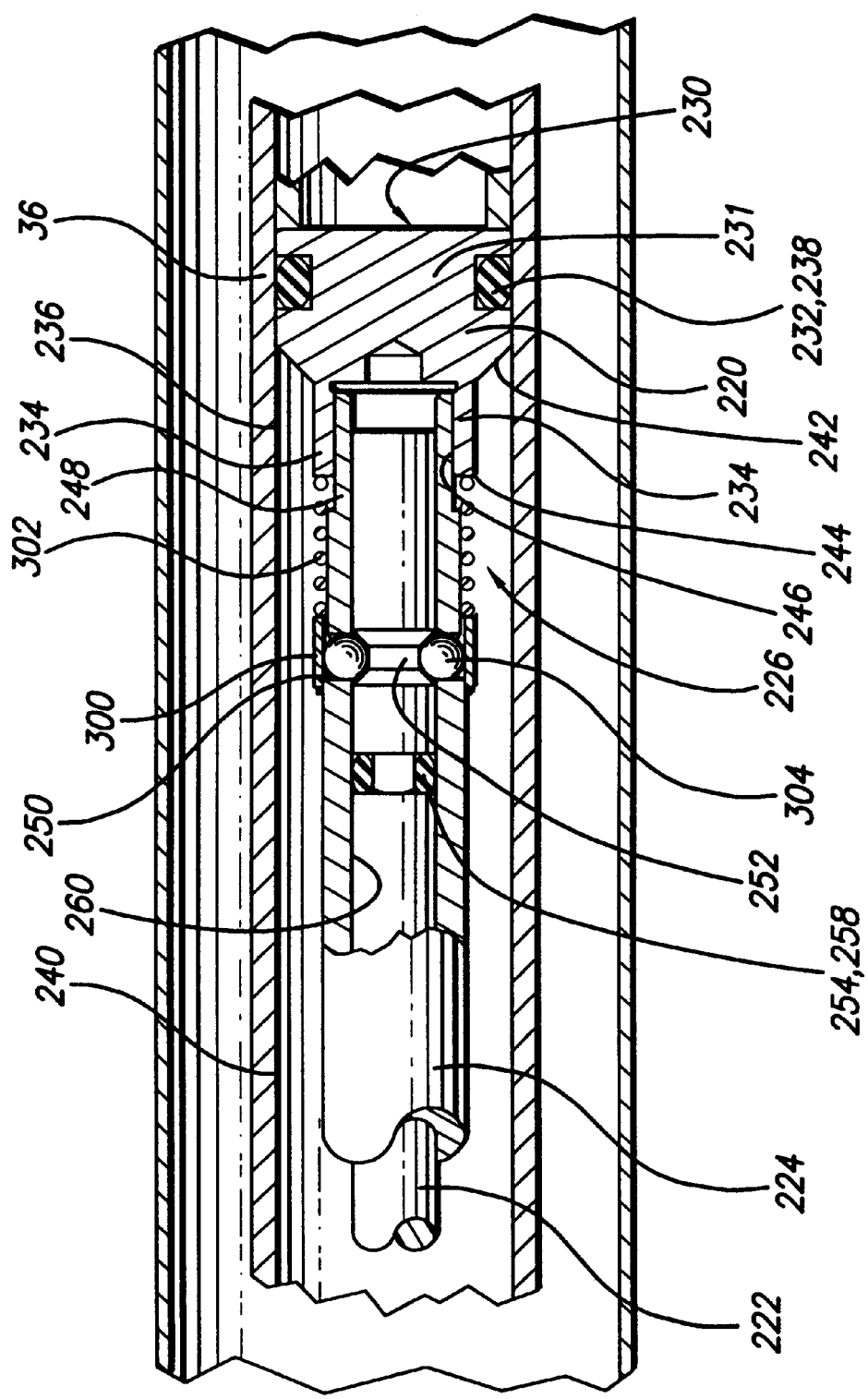
FIG. 5 is an enlarged cross section of the portion of the hydraulic strut shown in FIG. 2, circle 5.

The locking mechanism 226 includes a locking sleeve 300, a sleeve spring 302 and the two locking balls 304. The sleeve spring 302 is braced against the rim 244 at one end of the spring and braced against the locking sleeve 300 at the other end of the spring. The locking sleeve 300 circumferentially surrounds the outer shaft 224. Extending radially outward from the shaft 224, is an annular small shoulder 303. The locking sleeve 300 contacts and is urged against the small bracing shoulder 449 by the sleeve spring 302. When the strut is not in the fully extended position, the locking mechanism is disengaged, as is shown in FIG. 5. In this disengaged position, the locking sleeve 300 retains the locking balls 304 within the space formed by the alignment of the trapezoidal groove 252 and the openings 250.

Figure 6:
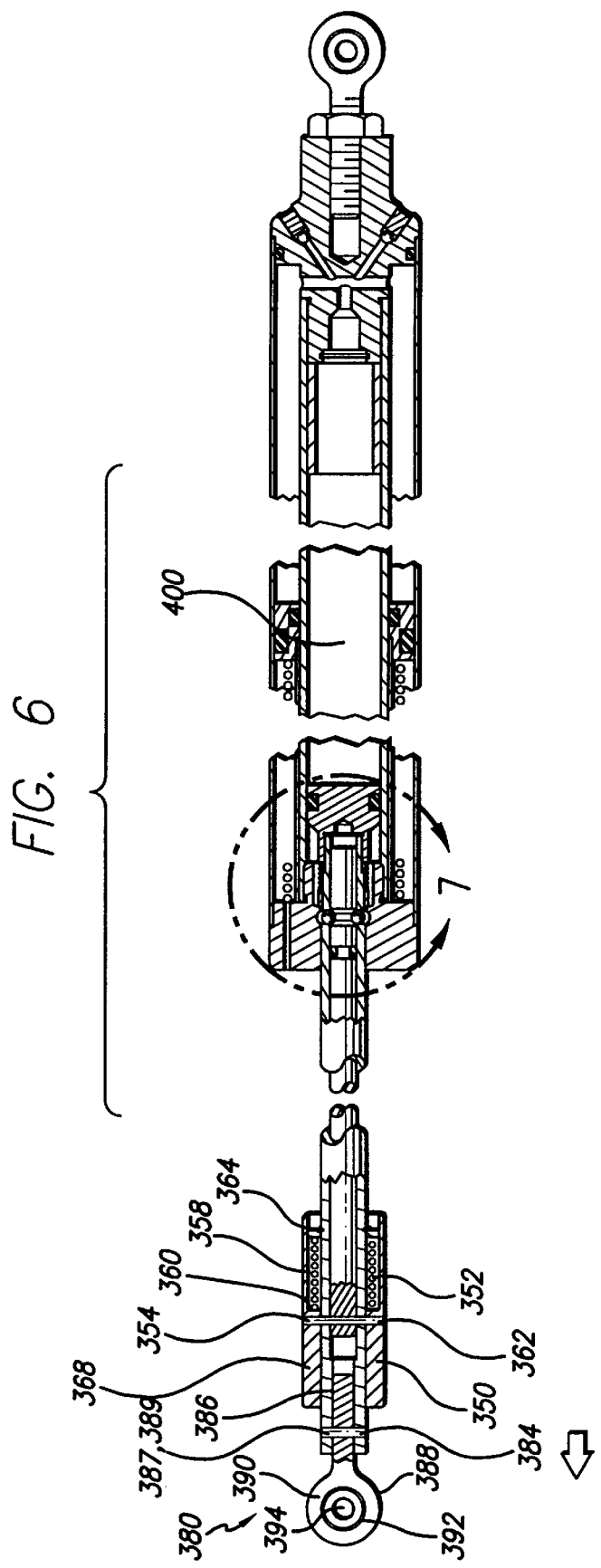
FIG. 6 is a cross section of the hydraulic strut of FIG. 2 in an extended position, before the locking mechanism is fully engaged.

With reference to FIGS. 2 and 6, the release mechanism 204 includes a release sleeve 350, a release sleeve spring 352 and a connector pin 354. The release sleeve 350 is tube shaped and circumferentially disposed around the outer shaft 224, outside of the outer telescoping member 32. The release sleeve 350 has an outer surface 356 which is easily manipulable by hand, a spring retaining wall 358 and a spring bracing wall 360. The outer surface 356 may be knurled or otherwise treated to improve its ability to be gripped and manipulated by hand. The release sleeve 350 is movably positioned by the release sleeve spring 352. The release sleeve spring 352 is braced against the spring bracing wall 360 and positioned radially between the spring retaining wall 358 of the release sleeve 350 and the outside of the outer shaft 224. The outer shaft 224 also has disposed circumferentially about it and firmly attached to it, a bracing ring 364. The release spring 352 is braced against the bracing ring 364. The release sleeve 350 also has a pair of radially extending, diametrically opposed apertures 362 through which a connector pin 354 is inserted. The connector pin 354 also passes through opposed longitudinal slots 368 in the outer shaft 224 and through an aperture in the inner shaft 222. With this configuration, longitudinal movement of the release sleeve 350 will move the inner shaft 224 the same longitudinal distance as the release sleeve 350.

The mount portion 202 includes an eyelet mount 380, and a pin 384. The eyelet mount 380 includes a threaded shank 386, and an eyelet 388. The threaded shank 386 is threadibly mounted on the outer shaft 224. The eyelet 388 includes a solid ring 390, a circular groove 392, and an aperture 394 formed at the radial center of the ring 390. This configuration of the eyelet 388 allows the strut to be mounted on a conventional axle swivel mount (not shown). The pin 384 passes through opposed apertures 387 in the outer shaft 224, and through the threaded shank 386 thereby securing the mount portion 202 in place.

With reference to FIG. 2, when the strut is fully assembled and in operation, it contains hydraulic fluid (not shown). Preferably, the hydraulic fluid is military grade number MIL-H-83282. The hydraulic fluid is injected into the assembled strut 28 during manufacture through the two angular bores 68 formed in the sloping shoulder 64. The angular bores 68 are then sealed by insertion of the sealing ball 74, and then the plug 76, into the large diameter sealing portion 72.

Hydraulic fluid is retained in the transverse bore 67, each of the small diameter channel portions 70 of the two angular bores 68, the longitudinal bore 84, the valve chamber 86, a second hydraulic reservoir 400, which is defined by the inner cylinder 222 and the face 230 of the main piston head 200 and in a first hydraulic reservoir 402, which is defined by the space between the inner cylinder 36 and the outer cylinder 34 and limited by the auxiliary piston 172. When the strut is in operation, a fluid flow path is defined by these members as follows. As the strut extends, hydraulic fluid flows from the first hydraulic reservoir 402 into the transverse bore 67. Fluid flow follows the transverse bore 67 radially inward to the longitudinal bore 84. Fluid flow follows the longitudinal bore along the radial center of the outer telescoping member 30 and into the valve chamber 86. Fluid flows through the valve 100 and into the second hydraulic reservoir 400. Fluid flow may also follow the same path in a reverse direction when the strut is being compressed.

With reference to FIGS. 2, 3, 4, and 5 the strut is in a completely compressed position. As the strut extends, the main piston moves longitudinally in the second hydraulic reservoir 400 away from the valve 100. This movement creates a suction force on the hydraulic fluid and draws fluid from the first hydraulic reservoir along the fluid flow path and into the main hydraulic chamber 400. At the same time, fluid pressure builds up at the spherical end 102 of the valve. This forces the moveably retained valve 100 to move toward the snap ring 95. This movement is halted when the protruding lip 107 contacts the snap ring. This position of the valve allows fluid to flow through both the narrow diameter channel 124 and the four large diameter fluid flow openings 108, 110, 112, 114. This allows significantly increased fluid flow and therefore enables the strut to extend rapidly.

This rapid extension is also aided by the action of the auxiliary piston 172. As the strut extends and hydraulic fluid is drawn from the first hydraulic reservoir 402, the auxiliary piston 172 is pushed by the auxiliary piston spring 170 away from the cylinder head 38. This motion both reduces the volume of the first hydraulic reservoir 402, thus creating a variable reservoir for the hydraulic fluid, and helps inject the hydraulic fluid into the second hydraulic reservoir along the defined fluid flow path. The reduction in volume of the first hydraulic reservoir 402 prevents any suction force from building up within the first hydraulic reservoir 402 and counteracting the suction force created by the main piston 200. Additionally, air from outside of the strut can flow through the offset longitudinal bore 160 in the cylinder head 38 and into the volume behind the moving auxiliary piston 172. This action prevents a vacuum from forming behind the auxiliary piston 172 and therefore reducing the closure rate of the strut. These features allow the strut to open as rapidly as the main piston 200 can be moved and the valve 100 will allow.

With reference to FIGS. 6, 7, and 7A, as the strut 28 approaches its fully extended position the small bracing shoulder 449 passes into the shoulder slot 451, and the locking sleeve 300 contacts the rounded end wall 157 of the cylinder head 38. As the extending motion continues, the locking sleeve spring 300 is compressed. When the locking sleeve spring 300 is fully compressed, longitudinal motion of the main piston head 220 is arrested. In this position, the locking sleeve 300 no longer covers and retains the locking balls 304. Longitudinal motion of the inner shaft 222 continues as is described below. Due to this continued longitudinal motion, the surface of the trapezoidal groove 252 applies a lateral force to the locking balls 304, driving the locking balls 304 into the spherical groove 450 formed in the cylinder head 38 which lines up with the openings 250 formed in the outer shaft 224 when the strut 28 is in its extended position. Longitudinal motion of the inner shaft 222 ceases when the trapezoidal 252 has traversed completely past the locking balls 304.

The continued longitudinal motion of the inner shaft 222 which is alluded to above is accomplished by the action of the release mechanism 204. When the main piston head 220 and the outer shaft 224, to which the main piston head 200 is attached, cease moving, the release sleeve 350 is urged further away from the cylinder head 38 by the release sleeve spring 352. As the release sleeve spring extends and the release sleeve 350 moves away from the cylinder head 38, the connector pin 354, which is firmly attached to the release sleeve 350 and the inner shaft 222, also moves, forcing the inner shaft 222 to move the same longitudinal distance as the release sleeve 350. This action moves the trapezoidal groove 252 as is described above. The release sleeve 350 and inner shaft 222 stop moving when the connector pin 354 travels the entire extent of the opposed longitudinal slots 368.

Figure 8:
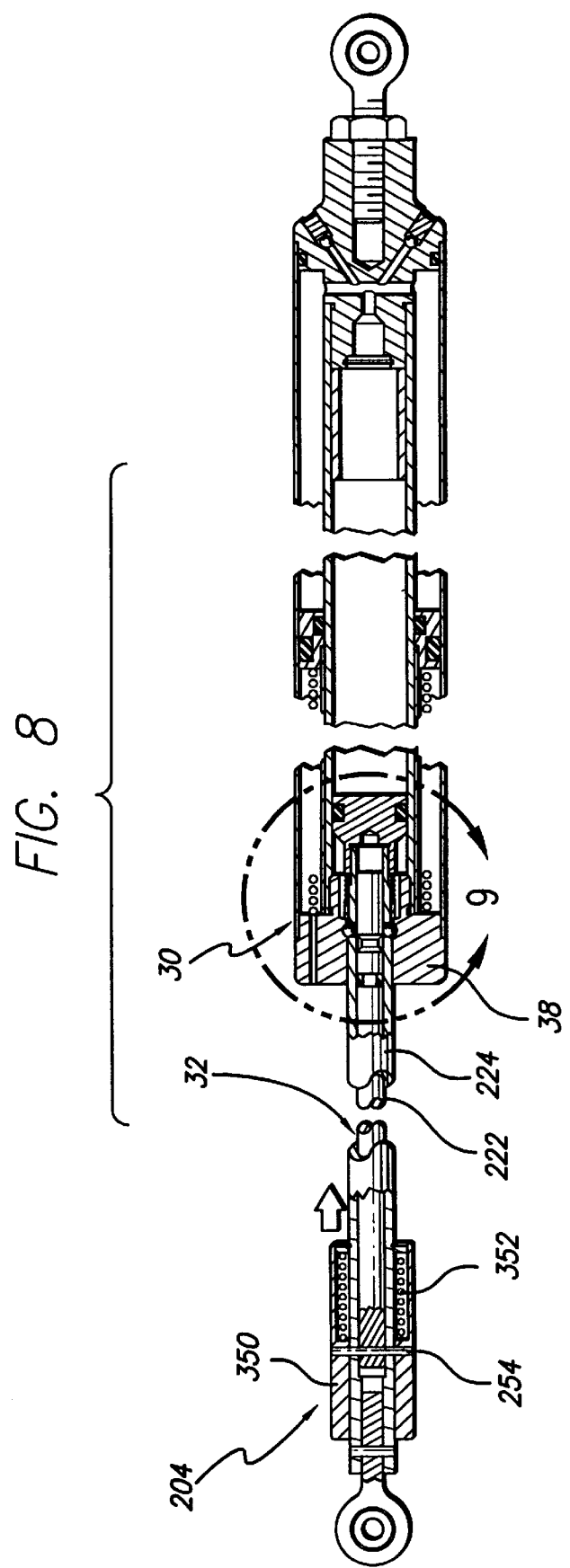
FIG. 8 is a cross section of the hydraulic strut in the extended position with the locking mechanism engaged.
Figure 9:
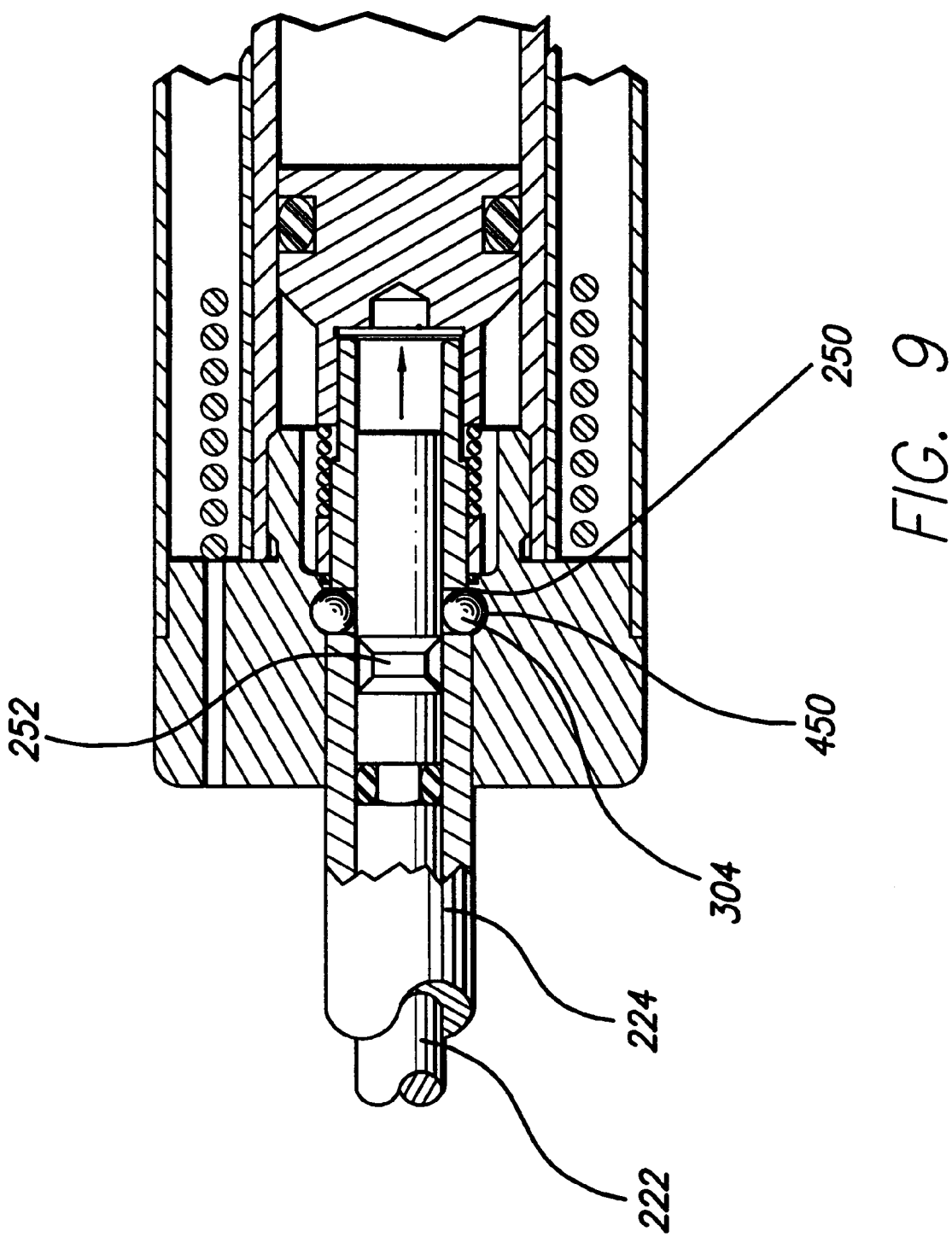
FIG. 9 is an enlarged cross section of the portion of the hydraulic strut shown in FIG. 8, circle 9.
Figure 10:
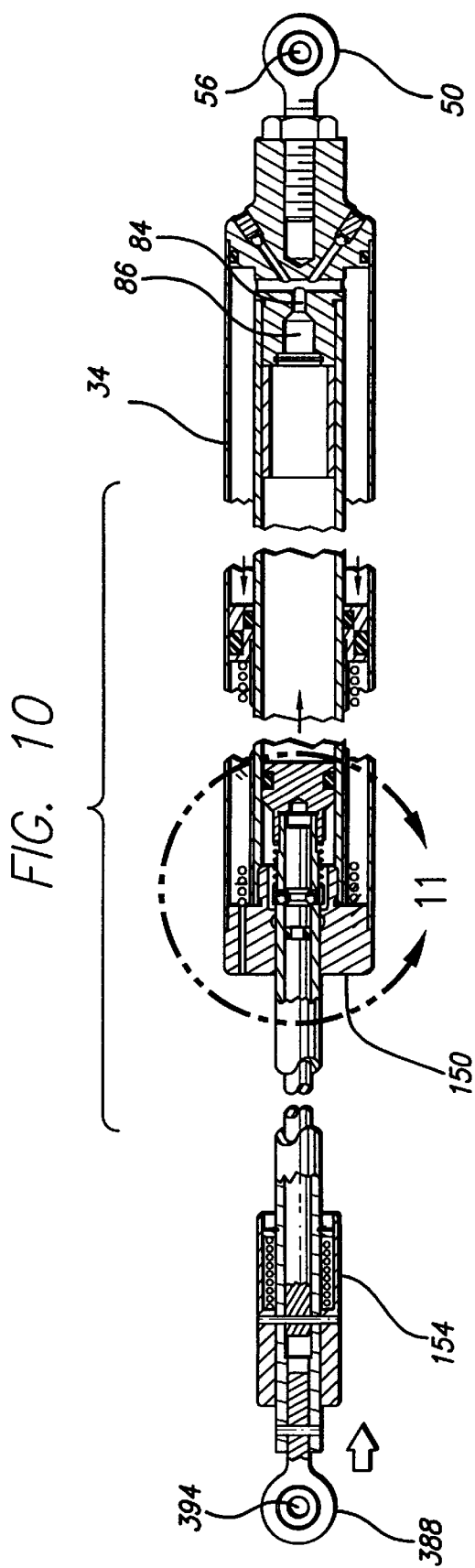
FIG. 10 is a cross section of the hydraulic strut in an intermediate position.
Figure 11:
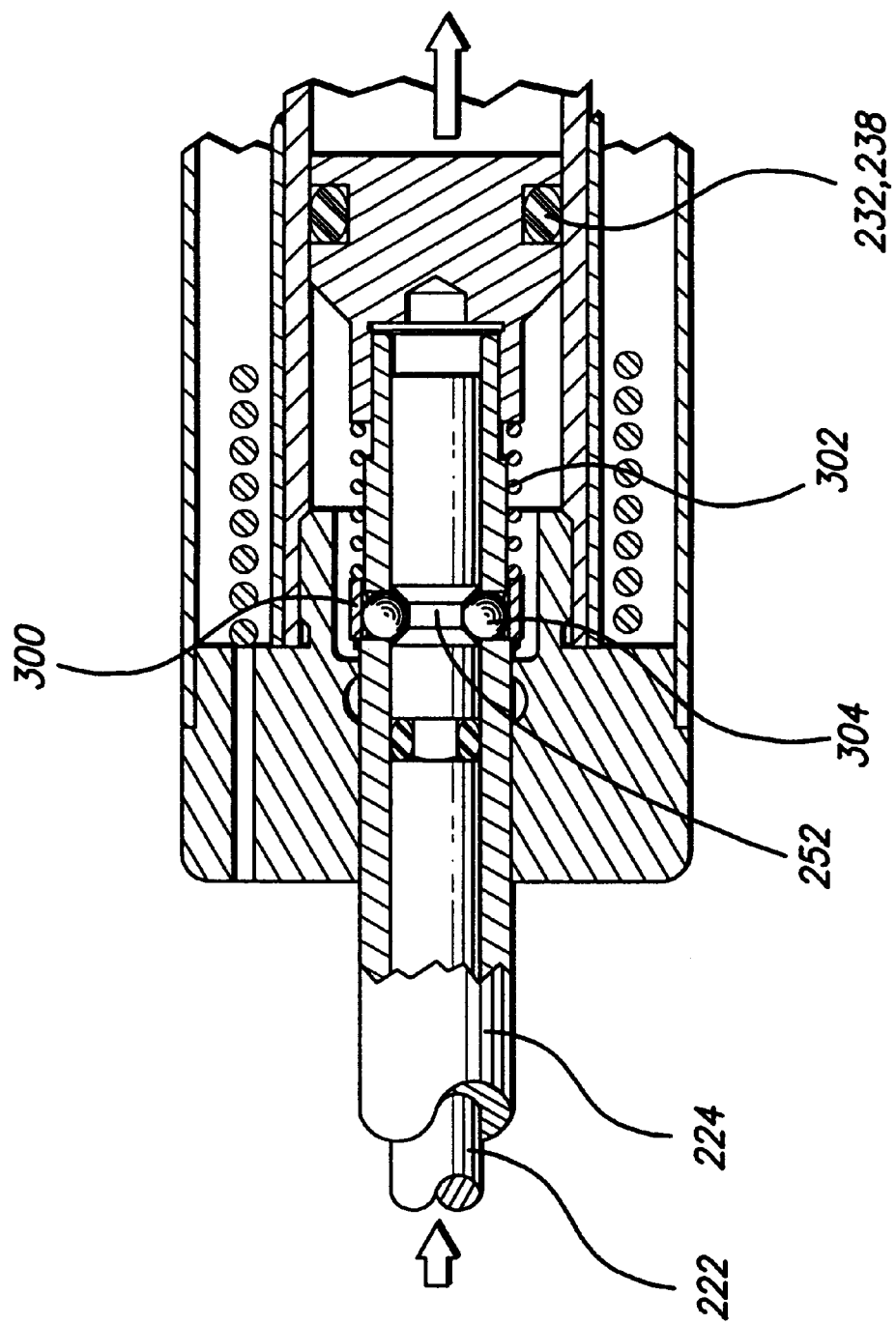
FIG. 11 is an enlarged cross section of the portion of the hydraulic strut shown in FIG. 10, circle 11.

When the strut 20, 22 is in the position shown in FIGS. 8 and 9, the inner telescoping member 32 is locked into place in relation to the outer telescoping member 30 by the presence of the locking balls 304 in the spherical groove 450 and the openings in the shaft 250. In this position, the weight of a load placed on the inner telescoping member is borne by the locking balls 304. By this action, the door 24 attached to the strut 20, 22 can be locked into an open position as shown in FIG. 1.

With reference to FIGS. 8, 9, 10 and 11, the strut can be released from the locked position by actuating the release mechanism 204. When a user moves the release sleeve 350 toward the cylinder head 38 as shown by the arrow, the connector pin 354, which is securely attached to the release sleeve 350 moves the inner shaft 222 the same longitudinal distance that the release sleeve 350 is moved. As the release sleeve 350 is moved, the release sleeve spring 352 compresses, and the inner shaft 222 moves to the position where the trapezoidal groove 252 lines up with the opposed openings 250 in the outer shaft 224 and the spherical groove 450. This allows the locking balls 304 to move back into the trapezoidal groove 252. Because the locking balls 304 no longer maintain contact with the cylinder head 38, the outer shaft 224 and the main piston head 200 may move longitudinally toward the valve 100 and the fully compressed position.

As the strut compresses toward this position, the main piston 200 traverses the second hydraulic reservoir 400 longitudinally. This motion of the main piston 200 creates pressure against the face 230 of the main piston 200 and is applied to the hydraulic fluid in the second hydraulic reservoir 400, to force hydraulic fluid to flow from the main hydraulic chamber 400 toward the first hydraulic reservoir 402 along the defined fluid flow path.

In turn, this fluid flow is dampened by the valve 100. As fluid flows from the second hydraulic reservoir 400, pressure builds against the interior bore 105 of the cylinder end 104 of the valve 100. Because the valve 100 is moveably retained within the valve chamber 86, this pressure causes the valve to slide toward the valve seat 85. The valve head 115 of the spherical end 102 of the valve 100 contacts the valve seat 85 and creates a seal. At the same time, the sloping shoulder 106 of the valve 100 contacts the valve chamber sloping wall 90. This positioning of the valve 100 prevents hydraulic fluid from flowing through any of the four large diameter fluid flow openings 108, 110, 112, 114. As a result, all fluid flow must pass through the single narrow diameter channel 124. This restriction of hydraulic fluid flow serves to dampen the strut and slow the rate at which it compresses. The valve 100 may also be spring biased toward the longitudinal bore 86 to provide for a faster valve response (not shown). A strut can, of course, be manufactured such that the valve 100 and valve chamber 86 are oriented in the opposite direction of the one described, to enable the strut to close rapidly and open slowly, or a simple restrictor valve can be used when it is desired that the strut open slowly and close slowly. When the face 230 reaches and contacts the stop sleeve 126, the hydraulic fluid flow stops and the strut has reached its fully compressed position.

As additional fluid enters the auxiliary chamber 402, the fluid applies pressure against the face 177 of the auxiliary piston 172. This pressure is opposed by the auxiliary piston spring 170, which provides a minimal counter-force to the pressure created by the main piston as the strut compresses. The counter-force allows the strut to smoothly transition from the locked position to the beginning of the compression action, thereby avoiding an initial slippage or jolt as the release mechanism 204 is activated. Pressure applied to the face 177 of the auxiliary piston 172 then compresses the auxiliary piston spring 170. As the auxiliary piston spring 170 compresses, the auxiliary piston 172 moves toward the cylinder head 38 and the volume of the first hydraulic reservoir 402 extends allowing more hydraulic fluid to exit the second hydraulic reservoir 400, travel along the fluid flow path, and enter the first hydraulic reservoir 402.

From the foregoing, it will be appreciated that the dampening strut of the present invention provides a strut which can open and close at two different speeds, is a compact, sealed, self-contained unit which requires no external fluid pump or injection device, and can be automatically locked in an open position.

While a particular form of the invention has been illustrated and described, it will be apparent that various modifications can be made without departing from the spirit and scope of the invention. Accordingly, it is not intended that the invention be limited, except as by the appended claims.

What is claimed is:

1. A hydraulic strut for mounting a movable structure to a support structure, the hydraulic strut comprising:
    an outer telescoping member having an outer cylinder and a mount for securing the outer cylinder to one of the movable structure and the supporting structure, the outer telescoping member further having a first hydraulic reservoir within the outer cylinder and a second hydraulic reservoir within the outer cylinder;
    an auxiliary piston which traverses within the first hydraulic reservoir in a longitudinal direction, the auxiliary piston including a front side and a back side, wherein the first hydraulic reservoir is vented to allow air from outside of the strut to reach the back side of the auxiliary piston such that movement of the auxiliary piston is not impeded by the creation of a partial vacuum behind the auxiliary piston;
    a fluid flow restrictor between the first and second hydraulic reservoirs for controlling the rate of flow of hydraulic fluid between the first and second hydraulic reservoirs in response to the direction of fluid flow; and
    an inner telescoping member having a mount for securing the inner telescoping member to the other of the movable structure and the supporting structure, the inner telescoping member including a main piston that translates within the second hydraulic reservoir between a closed position, wherein the inner telescoping member is fully retracted into the outer telescoping member, and an open position, wherein the inner telescoping member is fully extended from the outer telescoping member.

2. The hydraulic strut of claim 1, wherein the first hydraulic reservoir radially surrounds the second hydraulic reservoir.

3. The hydraulic strut of claim 2, wherein the auxiliary piston is spring-biased to a position wherein the amount of fluid in the first hydraulic reservoir is minimized.

4. A hydraulic strut for mounting a movable structure to a support structure, the hydraulic strut comprising:
    an outer telescoping member having an outer cylinder and a mount for securing the outer cylinder to one of the movable structure and the supporting structure, the outer telescoping member further having a first hydraulic reservoir within the outer cylinder and a second hydraulic reservoir within the outer cylinder;
    a fluid flow restrictor between the first and second hydraulic reservoirs for contrelling the rate of flow of hydraulic fluid between the first and second hydraulic reservoirs in response to the direction of fluid flow;
    an inner telescoping member having a mount for securing the inner telescoping member to the other of the movable structure and the supporting structure, the inner telescoping member including a main piston that translates within the second hydraulic reservoir between a closed position, wherein the inner telescoping member is fully retracted into the outer telescoping member, and an open position, wherein the inner telescoping member is fully extended from the outer telescoping member;
    wherein:
        the strut has a compressed position, an extended position, and a multiplicity of intermediate positions;
        the main piston further comprises,
            a piston head,
            an outer shaft which has a piston head end and a release sleeve end, wherein the outer shaft is attached to the piston head at the piston head end,
            an inner shaft moveably retained within the outer shaft,
            a locking sleeve circumferentially surrounding a portion of the outer shaft,
            a locking sleeve spring, which contact and biases the locking sleeve, and
            a plurality of locking balls movably retained by the locking sleeve;
        wherein the locking balls are held in a retained position by the locking sleeve when the strut is in the compressed position and the multiplicity of intermediate positions; and
        wherein the locking balls are released from the retained position by the locking sleeve when the strut is in the extended position such that the locking balls are in contact with both the outer shaft and the outer telescoping member to prevent movement of the outer shaft in relation to the outer telescoping member.

5. The hydraulic strut of claim 4 further comprises:
    a release sleeve circumferentially surrounding a portion of the outer shaft at the release sleeve end of the outer shaft, wherein the release sleeve is spring biased away from the piston head end; and a connector pin that attaches the release sleeve to the inner shaft;

wherein the outer shaft is formed to present a slot such that the connector pin may travel in the slot in a longitudinal direction, whereby moving the release sleeve in a longitudinal direction will also move the inner shaft the same direction and distance;

wherein longitudinal translation of the release sleeve toward the piston head end forces the locking balls back into the retained position such that the outer shaft may move in relation to the outer telescoping member.

* * * * *